Patented Jan. 9, 1923.

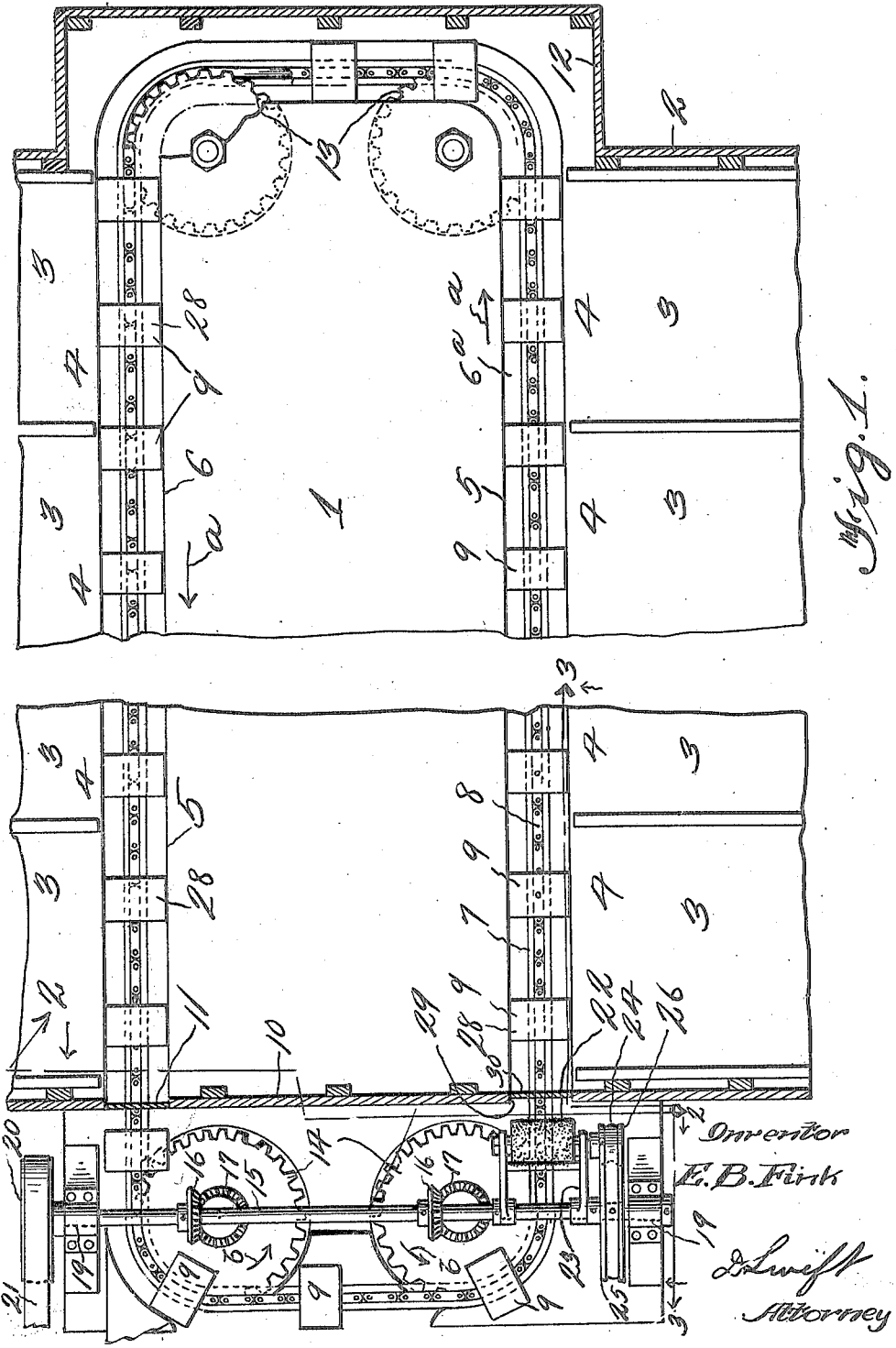

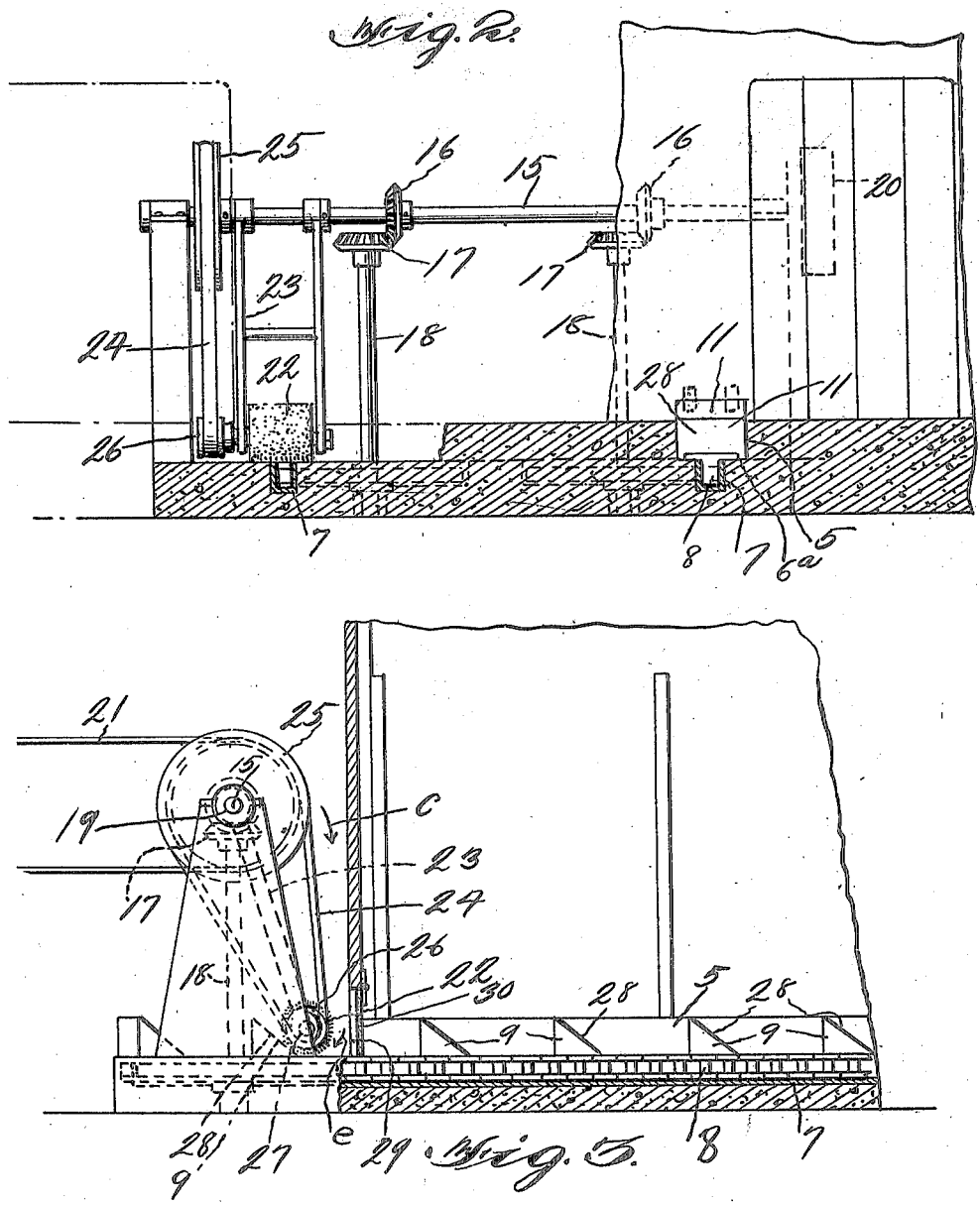

1,441,841

UNITED STATES PATENT OFFICE.

EDWARD B. FINK, OF PHILADELPHIA, PENNSYLVANIA.

LITTER CARRIER.

Application filed January 17, 1922. Serial No. 529,832.

*To all whom it may concern:*

Be it known that I, EDWARD B. FINK, a citizen of the United States, residing at Philadelphia, in the county of Philadelphia, State of Pennsylvania, have invented a new and useful Litter Carrier; and I do hereby declare the following to be a full, clear, and exact description of the invention, such as will enable others skilled in the art to which it appertains to make and use the same.

The invention relates to litter carriers for use in connection with cow stables and the like, and has for its object to provide a device of this character comprising an endless chain extending around sprockets and portion of the chain extending through troughs adjacent stalls and provided with litter scraping elements, which elements during the movement of the endless chain convey the litter to the outside of the stable to any suitable point of deposit.

A further object is to provide hinged doors gravity closed and actuated by the litter carrier and forming means for preventing entrance of cold air to the stable, as the various scraping elements pass through the wall of the stable.

A further object is to provide means for driving the endless chain and also at the same time locating a cleaning brush positioned to engage the cleaning elements and clean the same before they reenter the stable.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a horizontal sectional view through a portion of a barn showing a plan view of the stalls and the litter carrier.

Figure 2 is a transverse vertical sectional view through one end of the litter carrier and a portion of a barn.

Figure 3 is a detail sectional view taken on line 3—3 of Figure 1.

Referring to the drawings, the numeral 1 designates a passageway extending the length of the barn or stable 2, which passageway has disposed on either side thereof stalls 3, in which cattle or other animals are received. Disposed adjacent the ends 4 of the stalls 3, are the portions 5 of an endless litter receiving trough 6, in which trough a channel iron 7 is disposed for receiving and guiding the endless chain 8, which chain is substantially flush with the bottom 6ª of the trough and has secured thereto scraping blocks 9. The blocks 9 move in the direction of the arrows $a$ and scrape the litter and the like from the bottom 6ª of the trough and convey the same to a point outside the end 10 of the barn 2 where it is deposited in any suitable place. As each cleaning element 9 passes through the end 10 of the barn, a hinged closure 11 swings outwardly and as soon as the cleaning element has passed outside of the barn, the hinged closure 11 again swings to closed position thereby preventing entrance of cold air to the interior of the barn.

The endless chain 8 adjacent the end 12 of the barn passes over idle sprockets 13 which guide the chain in its movement. Chain 8 at a point outside of the end 10 of the barn passes over drive sprockets 14 which sprockets are driven by a driven shaft 15 provided with bevelled gear 16 which mesh with bevelled gear 17 carried by vertically disposed shafts 18, which shafts are carried by the drive sprockets 14. It will be seen that when the drive shaft 15 is rotated in its bearings 19 through the medium of the drive pulley 20, which may be belted through the medium of the belt 21 to any source of power that the drive sprockets 14 will be rotated simultaneously in the direction of the arrows $b$ and consequently the chain 7 will be moved in the direction of the arrow $a$, thereby causing the scraping elements 9 to scrape the litter from the trough 6 and convey the same to a point outside of the barn where it will be deposited. It is obvious that a portion of the litter may adhere to the blocks 10 and be carried back into the barn or stable, therefore to obviate this difficulty a rotary brush 22 is provided, which brush is carried by a frame 23 preferably pivotally mounted on the drive shaft 15 and driven by means of a belt 24, which belt extends over a pulley 25 carried by the drive shaft 15 and over a pulley 26 carried by the shaft 27 of the rotary brush. It will be seen that the belt 24 will move in the direction of the arrow $c$ and consequently the rotary brush will move in the direction of the arrow $e$, thereby during the rapid rotation thereof will engage the inclined surfaces 28 of the scraping and cleaning elements 9 and cleans said elements before they again enter the bar through the opening 29 which normally is closed by a hinged closure 30, thereby preventing entrance of air to the barn.

From the above it will be seen that a litter carrier is provided which is simple in construction, positive in its action, may be applied to any shape of barn whether round or L-shaped and one wherein a pivoted cleaning brush is provided which will prevent dirty cleaning elements from again entering the barn and the pivotal action thereof will allow sufficient play to accommodate a brush to the inclined surfaces 28 of the cleaning elements in such a manner that the brush will clean the entire surface 28 during a slight upward movement of the pivoted frame.

The invention having been set forth what is claimed as new and useful.

1. The combination with a barn having a passageway therethrough and stalls disposed to each side of said passageway, of means for cleaning litter from said barn, said means comprising an endless conveyor passing through troughs adjacent the stalls, said endless conveyor comprising a chain, said chain being disposed within a channel in the bottoms of the troughs, conveying and scraping elements carried by said chain, means for moving said chain, pivoted members carried by the barn and actuated by the conveying and scraping elements as they pass out of and into the barn and means for cleaning the scraping elements after they pass outside of the barn and before they re-enter the barn.

2. A litter carrier comprising an endless conveyor chain having scraping and conveying elements, said conveyor chain extending over idle sprockets, said chain also extending over spaced drive sockets, a drive shaft disposed above the drive sprockets, gear connections between the drive shaft and the drive sprockets, a pivoted frame carried by the drive shaft and having its free end disposed above the conveyor and in registration with the cleaning and scraping elements carried thereby, a rotary brush carried by the free end of the pivoted frame and connections between said brush and the drive shaft whereby said brush will be rotated during the movement of the endless conveyor, and as the cleaning and scraping elements pass thereunder.

3. The combination with a litter carrier comprising an endless conveyor having scraping elements thereon, said elements having their upper faces angularly disposed, of a pivoted cleaning member disposed above the conveyor, said pivoted cleaning element being pivotally mounted on a drive shaft, a rotary brush carried by the free end of the cleaning member and positioned to engage the angularly disposed faces of the cleaning elements and means for rotating the rotary brush through the medium of the drive shaft.

In testimony whereof I have signed my name to this specification in the presence of two subscribing witnesses.

EDWARD B. FINK.

Witnesses:
MARJORIE LOVELL,
WILLIAM McKILLIPS.